(12) United States Patent
Ciccone et al.

(10) Patent No.: US 7,802,982 B2
(45) Date of Patent: Sep. 28, 2010

(54) GROOVED-SURFACE AIR CONDUIT FOR INJECTION MOLDS

(75) Inventors: Vince Ciccone, Kleinburg (CA); Jerko Knezovic, Brampton (CA); Albert Wong, Mississauga (CA)

(73) Assignee: Top Grade Molds, Ltd., Mississauga, Ontario (CA)

( * ) Notice: Subject to any disclaimer, the term of this patent is extended or adjusted under 35 U.S.C. 154(b) by 736 days.

(21) Appl. No.: 11/430,552

(22) Filed: May 9, 2006

(65) Prior Publication Data
US 2006/0249862 A1 Nov. 9, 2006

Related U.S. Application Data

(60) Provisional application No. 60/679,112, filed on May 9, 2005.

(51) Int. Cl.
*B29C 45/40* (2006.01)
(52) U.S. Cl. .......................... 425/556; 264/334
(58) Field of Classification Search ............... 425/547, 425/548, 552, 556; 264/334
See application file for complete search history.

(56) References Cited

U.S. PATENT DOCUMENTS 5,783,233 A * 7/1998 Takahashi .................... 425/547
6,322,350 B1 * 11/2001 Voets et al. .................. 425/548

* cited by examiner

*Primary Examiner*—Tim Heitbrink
(74) *Attorney, Agent, or Firm*—Young Basile Hanlon & MacFarlane, PC (57) ABSTRACT

An improved mold assembly for producing an article and for use with an air source is disclosed. The mold assembly is of the type including at least two mold portions configurable to form a mold having an interior mold cavity in the shape of said article, one or more of said mold portions each including an interior conduit for delivering air from said air source in use. The improvement comprises, for each of said one or more mold portions, a pair of mold parts each having an abutment surface, one of said abutment surfaces having defined therein a groove. The pair of mold parts is disposed in an operative configuration whereat they define at least in part said each mold portion, whereat the abutment surfaces lie flush against one another and whereat the groove defines at least part of the interior conduit in said each mold portion.

8 Claims, 7 Drawing Sheets

GROOVED-SURFACE AIR CONDUIT FOR INJECTION MOLDS

This application claims benefit of the filing date of and right of priority of U.S. Provisional Patent Application Ser. No. 60/679,112 filed May 9, 2005 under 35 USC §119(e).

FIELD OF THE INVENTION

This invention relates to injection molds and, in particular, to injection molds including interior conduits for directing air from an air source external to the injection mold to locations inside the injection mold.

BACKGROUND OF THE INVENTION

Figure 1:
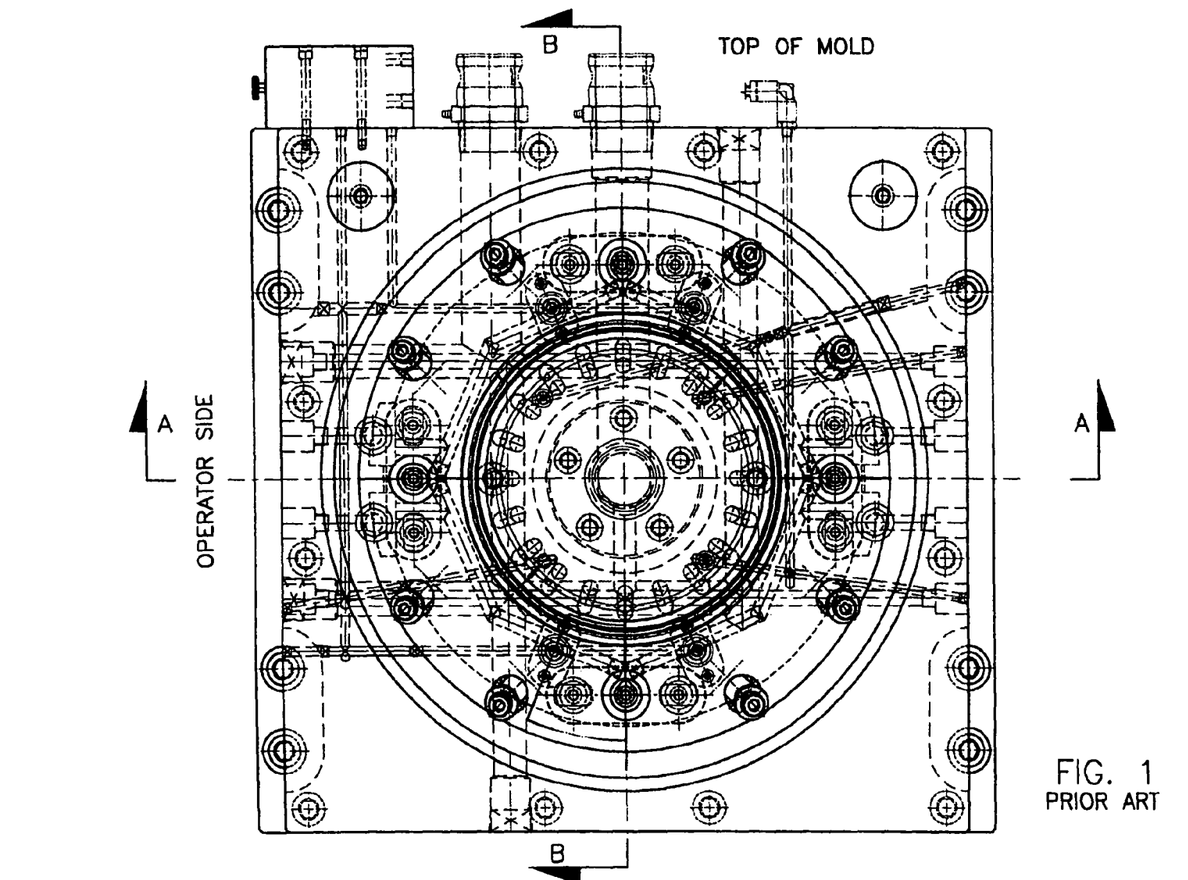
FIG. 1 is a plan view of the core portion of a single cavity container mold of the prior art.
Figure 2:
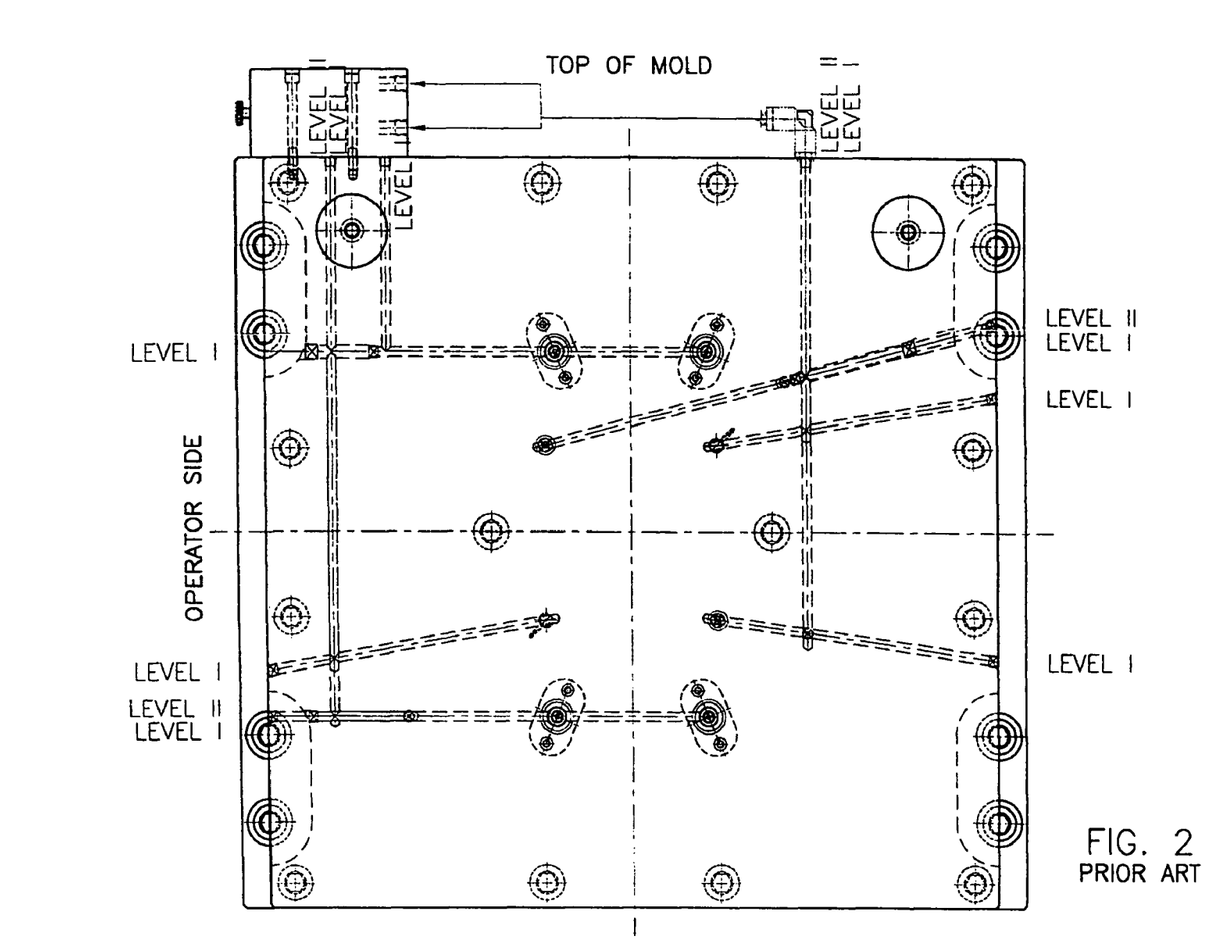
FIG. 2 is a simplified plan view of the core portion of FIG. 1, showing air functions in detail.
Figure 3:
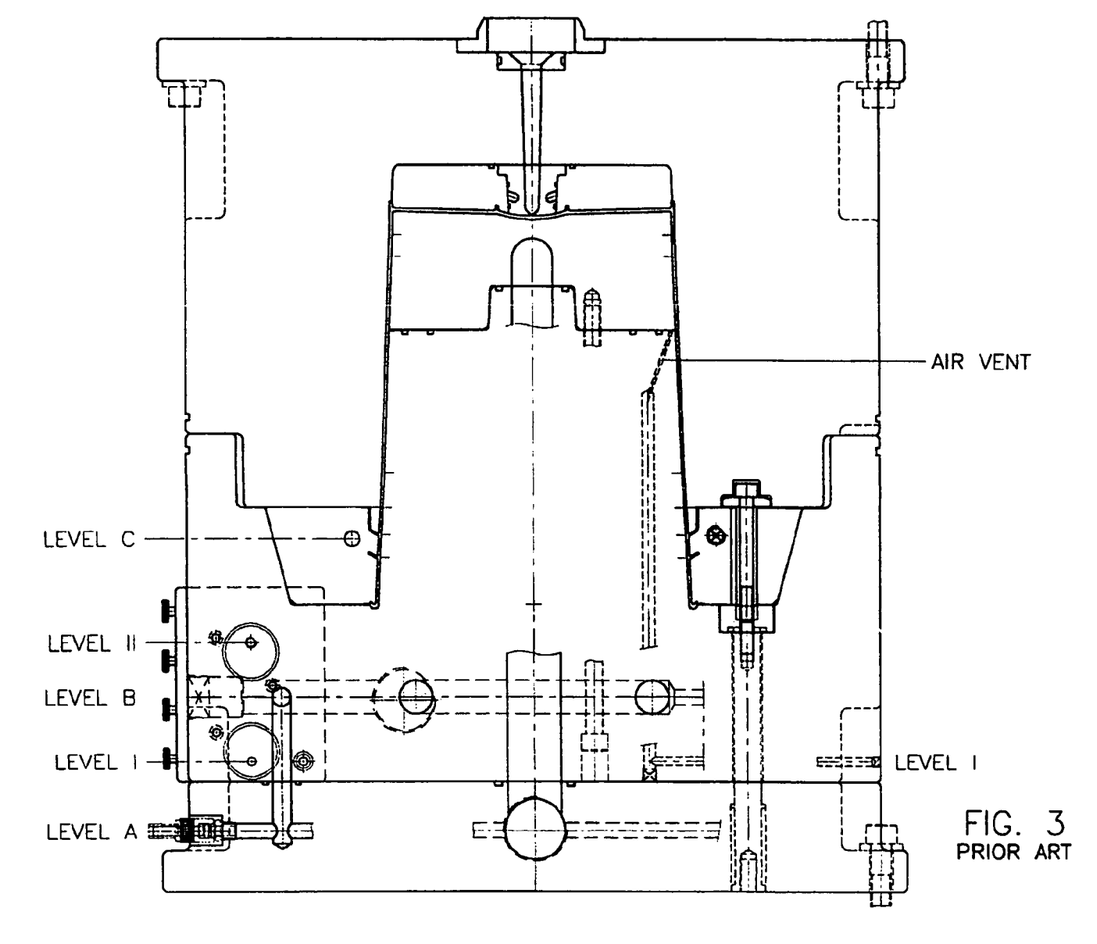
FIG. 3 is a vertical sectional view of a mold including the core portion of FIG. 1, showing that section of the core portion of FIG. 1 indicated by line A-A of FIG. 1.
Figure 4:
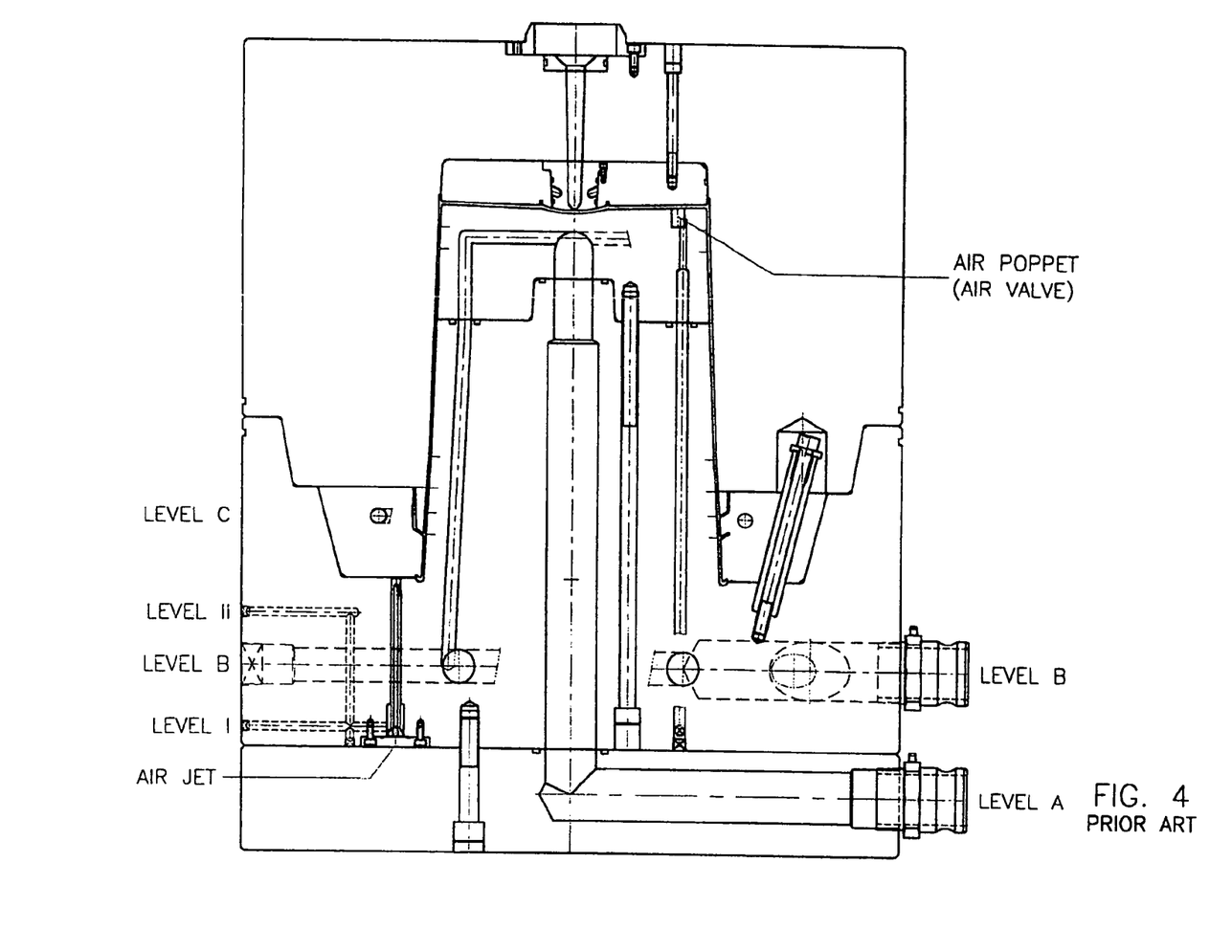
FIG. 4 is a vertical sectional view of the mold of FIG. 3, showing that section of the core portion of FIG. 1 indicated by line B-B of FIG. 1.

Injection molds often use air to achieve motion of various components. An exemplary single-cavity container mold of the prior art and of this general type is illustrated in FIG. 1 through FIG. 4. This mold includes a core plate, a core block, a core cap, a cavity block, a cavity insert and a set of collets. In use as shown in FIG. 4, the core block, core cap, cavity block, cavity insert and collets define a void shaped in the form of a pail, for receipt of hardenable resin. After resin has been injected into the void and allowed to harden to form a pail, the various parts are caused to separate from one another (not shown), to release the pail. This mold includes various pneumatic components, including air jets on the top and bottom of the mold, air vents between the core block and core cap and air poppets at the core cap to assist pail ejection and to actuate pneumatic components inside the mold. As can be seen clearly in FIG. 2, these components require numerous drillings (in the core block at Levels I, II, and to connect between these two levels) and the use of an external air manifold secured to the side of the mold and having tubing connections extending to various fittings on the side of the mold. While this drilling technique provides adequate functionality, it can be costly and time consuming. For example, provision of the air circuits in the prior art mold illustrated may require up to 80 hours of drilling time. This drilling technique can also tend to weaken the structure of the mold, as the mold can already be crowded with numerous other drilled bores. For example, bores are typically required for water-cooling circuits, and for mechanical subassemblies, such as cam pins (to guide the motion of collets) and mechanical knock-outs or ejector boxes (to activate the motion of collets).

SUMMARY OF THE INVENTION

An improved mold assembly for producing an article and for use with an air source forms one aspect of the invention. This mold assembly is of the type including at least two mold portions configurable to form a mold having an interior mold cavity in the shape of said article, one or more of said mold portions each including an interior conduit for delivering air from said air source in use. The improvement comprises, for each of said one or more mold portions, a pair of mold parts each having an abutment surface, one of said abutment surfaces having defined therein a groove. The pair of mold parts is disposed in an operative configuration whereat they define at least in part said each mold portion, whereat the abutment surfaces lie flush against one another and whereat the groove defines at least part of the interior conduit in said each mold portion.

According to another aspect, each of the abutment surfaces can have defined therein a groove, the grooves of the abutment surfaces of each pair of mold parts together defining the interior conduit of the mold portion defined at least in part by said each pair of mold parts.

According to another aspect, the mold assembly can comprise a plurality of air conduits.

According to another aspect, the plurality of air conduits can be connected to one another by drilled bores.

An improved mold assembly for producing an article and for use with an air source forms another aspect of the invention. This mold assembly is of the type including at least two mold portions configurable to form a mold having an interior mold cavity in the shape of said article, one of said mold portions including an interior conduit for delivering air from said air source in use. The improvement comprises a pair of mold parts each having an abutment surface, one of said abutment surfaces having defined therein a groove. The pair of mold parts is disposed in an operative configuration whereat they define at least in part said one mold portion, whereat the abutment surfaces lie flush against one another and whereat the groove defines at least part of the interior conduit.

According to another aspect, said one mold portion can be a mold core portion.

According to another aspect, said one mold portion can be a mold cavity portion.

According to another aspect, each of the abutment surfaces can have defined therein a groove, the grooves together defining the interior conduit when the mold parts are disposed in the operative configuration.

Forming another aspect of the invention is a process for providing an air conduit in an injection mold for an article. This process comprises the steps of: providing at least two mold portions configurable to form a mold having an interior mold cavity in the shape of said article, at least one of said mold portions having at least two mold parts, said mold parts collectively having a pair of abutment surfaces and an operative configuration, in which configuration, the pair of abutment surfaces lie flush against one another; and machining a groove on one of the abutment surfaces such that, when the mold parts are in the operative configuration, the groove defines, at least in part, said air conduit.

According to another aspect, said at least two mold portions can comprise a mold cavity portion and a mold core portion, and the air conduit can be defined within the mold cavity portion.

According to another aspect, said at least two mold portions can comprise a mold cavity portion and a mold core portion, and the air conduit can be defined within the mold core portion.

According to another aspect, a groove can be machined on each of the abutment surfaces such that, when the mold parts are in the operative configuration, the grooves together define the air conduit.

According to another aspect, a plurality of grooves can be machined, to define a plurality of air conduits.

According to another aspect, the process can further comprise the step of: boring at least one hole through one or more of the mold parts to interconnect the plurality of air conduits.

An improved mold assembly for producing an article and for use with an air source forms another aspect of the invention. This mold assembly is of the type including at least two mold portions configurable to form a mold having an interior mold cavity in the shape of said article, said at least two mold portions collectively having a conduit for directing, in use, air from the source to a location inside the mold. The improvement comprises: an air pressure controller mounted to the mold assembly and providing for fluid communication, in use, between the source and the conduit, for the control of air flow from the source to the location inside the mold.

According to another aspect, one of the at least two mold portions can have the conduit.

The invention provides a mold having similar functionality to molds of the prior art but which requires less machining to produce and which can be more robust. Other advantages, features and characteristics of the present invention, as well as methods of operation and functions of the related elements of the structure, and the combination of parts and economies of manufacture, will become apparent upon consideration of the following detailed description and the appended claims with reference to the accompanying drawings, the latter being briefly described hereinbelow.

DETAILED DESCRIPTION

Figure 5:
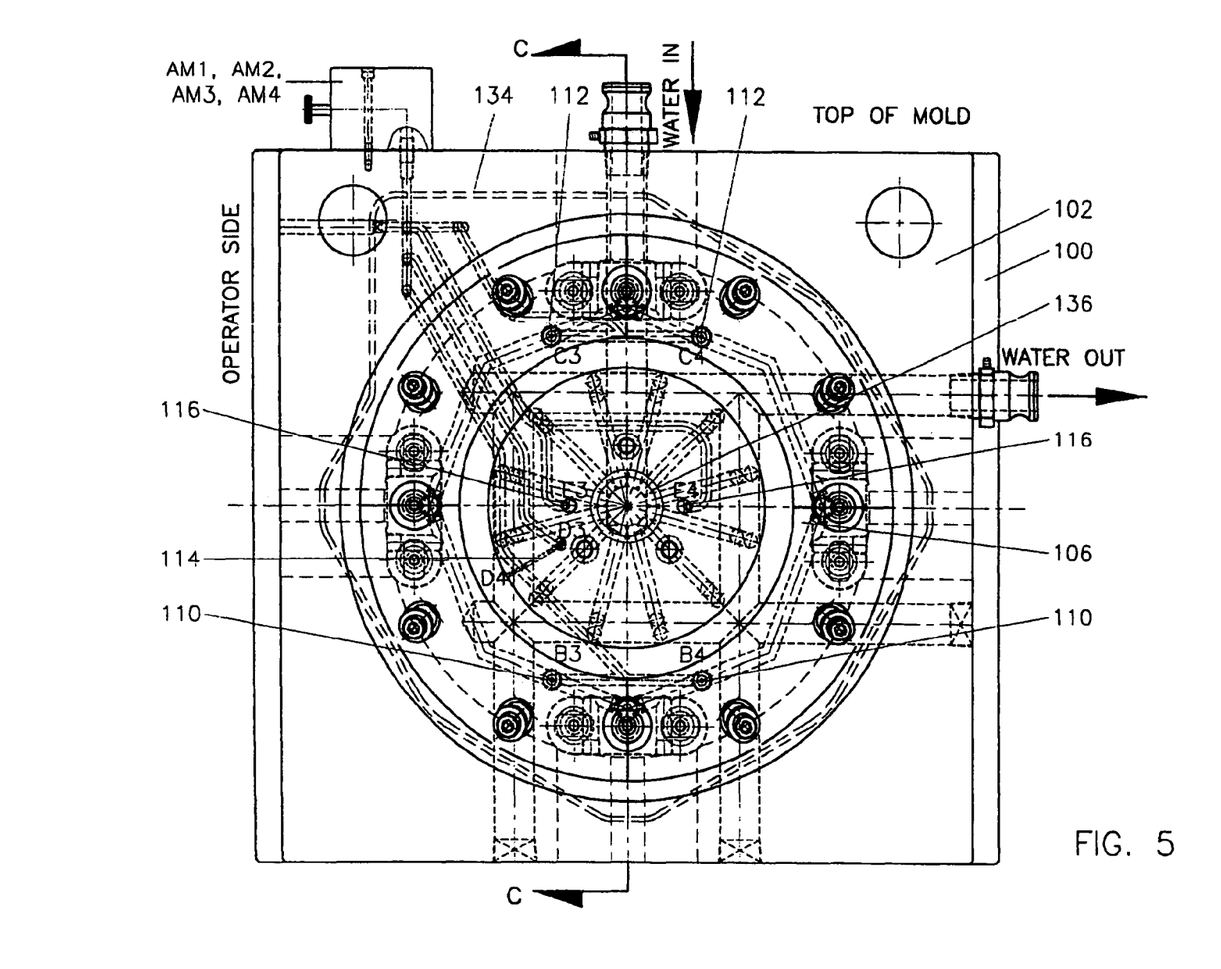
FIG. 5 is a plan view of the core portion of a single-cavity container mold constructed according to a preferred embodiment of the present invention.
Figure 6:
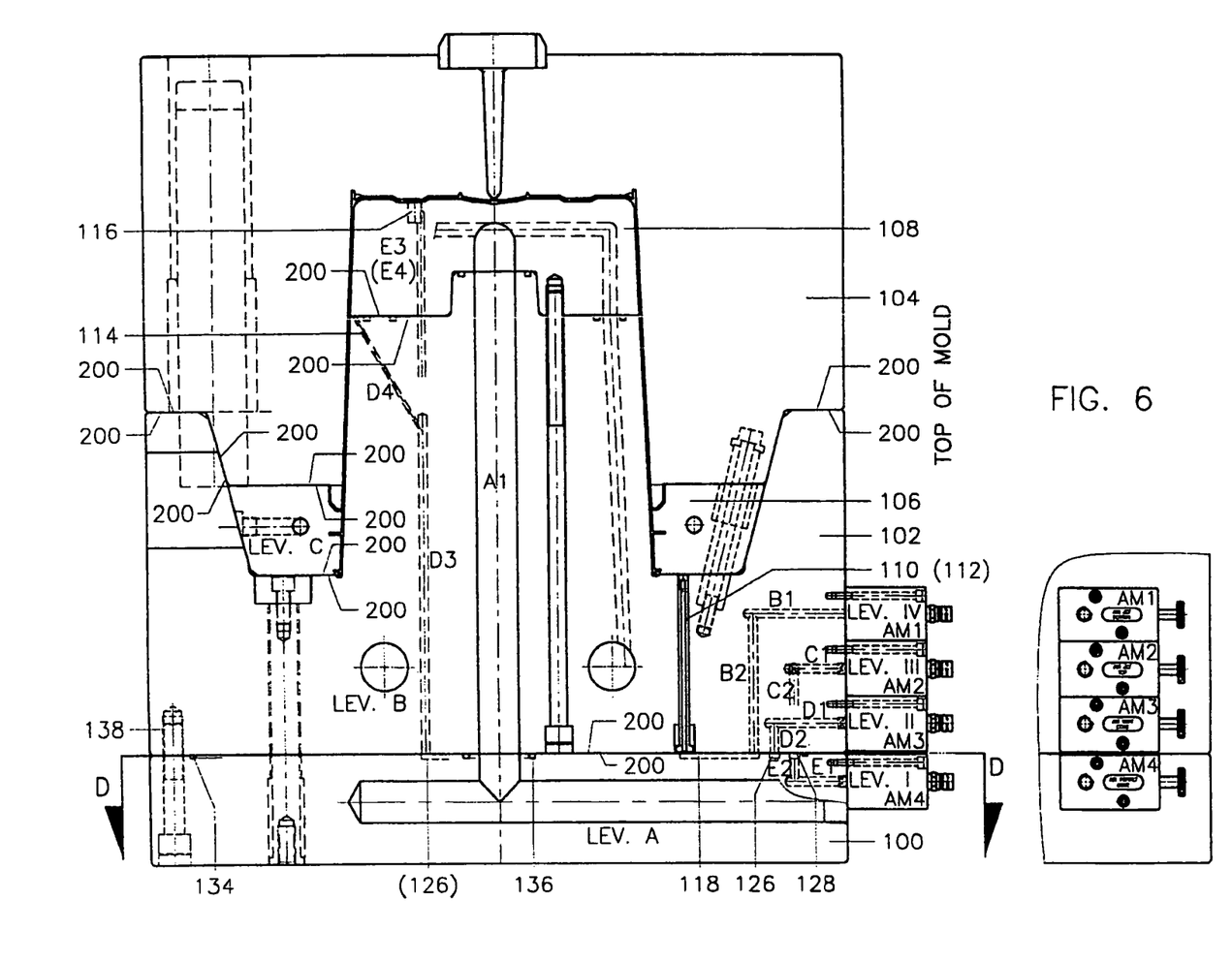
FIG. 6 is a vertical sectional view of a mold including the core portion of FIG. 5, showing that section of the mold indicated by line C-C of FIG. 5.
Figure 7:
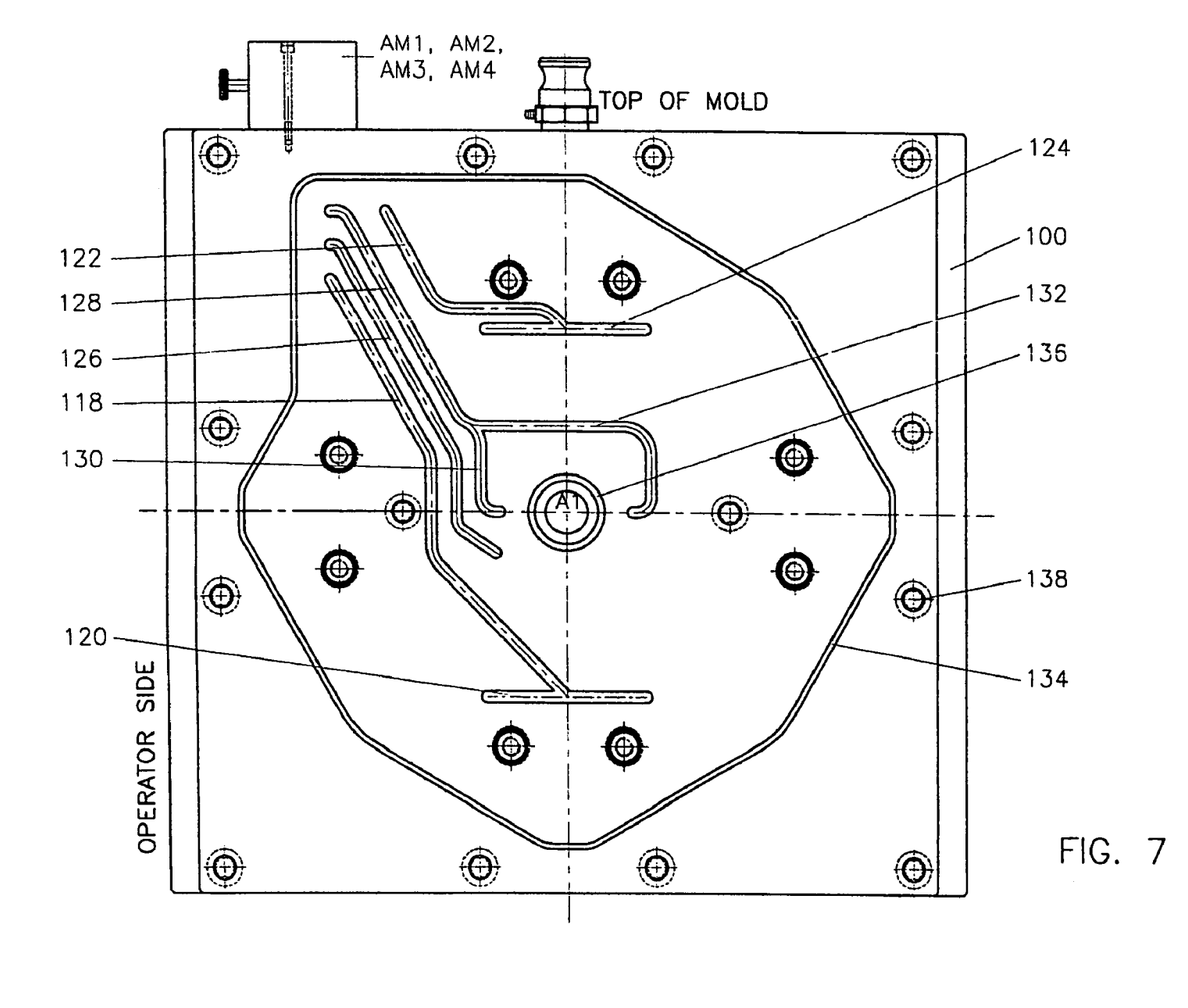
FIG. 7 is a horizontal sectional view of the mold of FIG. 6 showing that section of the mold of FIG. 6 identified by line D-D of FIG. 6.

A preferred embodiment of the present invention will now be described with reference to FIGS. 5, 6 and 7, which show a single-cavity container mold assembly that uses mechanical knockout systems for collet motion. This mold assembly, as shown in FIG. 6, comprises a number of mold parts including a core plate 100, a core block 102, a cavity block 104, a set of collets 106, and a core cap 108. The core plate 100, core block 102 and core cap 108 collectively define a core portion or die of the mold. The cavity block 104 and collets 106 collectively define a cavity portion or die of the mold. The various parts have abutment surfaces 200 and further have an operative configuration wherein the parts are pressed against one another so as to define a mold having an interior mold cavity, as shown in FIG. 6, for receiving hardenable synthetic resin. After resin has been injected into the cavity and allowed to harden to form a molded article, the core portion and the cavity portion can be separated from one another (not shown) to release the article. When the parts 100, 102, 104, 106, 108 are so pressed against one another, adjacent abutment surfaces 200 lie flush against one another. In the preferred mold illustrated, four air functions are provided: two top air jets 112; two bottom air jets 110; air vent 114; and air poppets 116. In use, as seen in FIGS. 5, 7, air supplied under pressure from an external source (not shown) is directed through air manifolds AM1, AM2, AM3, AM4 secured to the side of the mold, to a series of grooves 118, 120, 122, 124, 126, 128, 130, 132 machined in the core plate 100, at the abutment surface 200 thereof which contacts the adjacent abutment surface 200 of core block 102. The grooves 118, 120, 122, 124, 126, 128, 130, 132, in combination with the abutment surface 200 lying against the surface 200 in which they are formed, define conduits or channels for delivering air from the external source to locations in the mold. Each air manifold AM1, AM2, AM3, AM4 is an air pressure controller of mechanical or electronic design and controls a unique air function. With reference to FIGS. 5, 6, 7, air manifold AM1 selectively supplies air, through drilled holes B1 and B2 in core block, to beginning of groove 118. Groove 118 is connected to groove 120 which then directs this air pressure to holes B3 and B4 representing the bottom air jets 110. Similarly, air manifold AM2, through drilled holes C1 and C2, selectively supplies air to groove 122, which directs it through groove 124 to vertical holes C3 and C4, which represent the top air jets 112. Air manifold AM3, through drilled holes D1 and D2, selectively supplies air to groove 126, which transfers it to vertical hole D3 and angled hole D4, representing the core cap vent 114. Finally, air manifold AM4 selectively supplies air, through drilled holes E1 and E2, to groove 128 which connects, through grooves 130 and 132, to vertical holes E3 and E4 and hence to air poppets 116. A large gasket 134, housed in a groove in core plate 100, surrounds the area enclosing all the air grooves and their connecting vertical holes. Any cooling holes located within the enclosure of gasket 134 must be individually sealed to prevent water leaks between plates. Such is the case of vertical hole A1 at the center of the mold, which directs coolant from the core plate inlet at Level A, through core block 102, to core cap 108. Gasket 136 separates the wet area at hole A1 from the dry area enclosed by gasket 134. The holding pressure of bolts 138 (FIGS. 6, 7) prevents loss of air pressure between core plate 100 and core block 102.

This design reduces machining time and costs considerably as compared to the design of FIG. 1 through FIG. 4: as previously indicated, provision of the air circuits in the design of FIG. 1 through FIG. 4 can require up to 80 hours drilling time, whereas the provision of the air channels, sealing gasket grooves and bores associated with the air circuits of the design of FIG. 5 through FIG. 7 requires only approximately 8 hours machining time. At the same time, as a large number of drilled holes are eliminated in the core block of the design of FIG. 5, 6, 7, it is much stronger than the corresponding block of the illustrated prior art mold. As a yet further advantage, the air channels of the preferred embodiment are more accessible than drilled holes, resulting in easier cleaning and maintenance.

While but a single embodiment of the present invention has been herein shown and described, it will be understood that various changes in size and shape of parts may be made. For example, only, whereas in the embodiment illustrated grooves 118 through 132 have been machined on abutment surface 200 of core plate 100, they could easily be machined on abutment surface 200 of core block 102, if so desired. As well, the number and combination of air circuits, as well as their position and orientation can vary from mold to mold. Further, whereas the system is shown in application in a single-cavity container mold, it could also be used for multi-cavity molds, lid molds and on the mold cavity half. Accordingly, the invention is to be understood as limited only by the claims appended hereto, purposively construed.

What is claimed is:

1. An improved mold assembly for producing a container and for use with an air source, said mold assembly including at least two mold portions configurable to form a mold having an interior mold cavity in the shape of said container, one or more of said mold portions each including an interior conduit for delivering air from said air source to locations in the mold cavity for operating ejector elements in use, wherein the improvement comprises:

a pair of mold parts each having an abutment surface, one of said abutment surfaces having defined therein an air supply groove, said pair of mold parts being disposed in an operative configuration whereat they define at least in part said one mold portion, whereat the abutment surfaces lie flush against one another and whereat said pair of mold parts are pressed together such that the groove defines at least part of the interior conduit to furnish air to said ejector elements.

2. An improved mold assembly according to claim 1, wherein each of the abutment surfaces has defined therein an air supply groove, the grooves of the abutment surfaces of each pair of mold parts together defining the interior conduit of the mold portion defined at least in part by said each pair of mold parts; and container elector elements connected to receive air through at least some of said grooves.

3. An improved mold assembly according to claim 1, wherein the mold assembly comprises a plurality of air conduits.

4. An improved mold assembly according to claim 3, wherein the plurality of air conduits are connected to one another by drilled bores.

5. An improved mold assembly for producing a container and for use with an air source, said mold assembly including at least two mold portions configurable to form a mold having an interior mold cavity in the shape of said container, one of said mold portions including an interior conduit for delivering air from said air source to the mold cavity in use, wherein the improvement comprises:

a pair of mold parts each having an abutment surface, one of said abutment surfaces having defined therein a groove, said pair of mold parts being disposed in an operative configuration whereat they define at least in part said one mold portion, whereat the abutment surfaces lie flush against one another and whereas:

said pair of mold parts are pressed together such that the air supply groove defines at least part of the interior conduit.

6. An improved mold assembly according to claim 5, wherein said one mold portion is a mold core portion.

7. An improved mold assembly according to claim 5, wherein said one mold portion is a mold cavity portion.

8. An improved mold assembly according to claim 5, wherein each of the abutment surfaces has defined therein a groove, the grooves together defining the interior conduit when the mold parts are disposed in the operative configuration.

* * * * *